United States Patent
Rice (10) Patent No.: US 11,656,835 B1
(45) Date of Patent: May 23, 2023

(54) SYSTEMS AND METHODS FOR SPATIAL CONVERSION AND SYNCHRONIZATION BETWEEN GEOLOCAL AUGMENTED REALITY AND VIRTUAL REALITY MODALITIES ASSOCIATED WITH REAL-WORLD PHYSICAL LOCATIONS

(71) Applicant: Transmira, Inc., Raleigh, NC (US)

(72) Inventor: Robert A. Rice, Raleigh, NC (US)

( * ) Notice: Subject to any disclaimer, the term of this patent is extended or adjusted under 35 U.S.C. 154(b) by 0 days.

(21) Appl. No.: 17/564,872

(22) Filed: Dec. 29, 2021

(51) Int. Cl.
*G06F 3/14* (2006.01)
*G06T 19/00* (2011.01)

(52) U.S. Cl.
CPC .......... *G06F 3/1454* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 10,275,919 B1* | 4/2019 | Bastide | G06T 7/50 |
| 11,367,060 B1* | 6/2022 | Barbashin | H04N 21/8352 |
| 2012/0249741 A1* | 10/2012 | Maciocci | G06T 19/006 348/51 |
| 2015/0091780 A1* | 4/2015 | Lyren | G02B 27/017 345/8 |
| 2016/0196694 A1* | 7/2016 | Lindeman | G02B 27/0172 345/633 |
| 2016/0357491 A1* | 12/2016 | Oya | G06F 3/0488 |
| 2018/0089896 A1* | 3/2018 | Starr | G06T 11/00 |
| 2018/0107269 A1* | 4/2018 | Benzies | G06F 3/011 |
| 2018/0330542 A1* | 11/2018 | Bharti | G02B 27/0172 |
| 2019/0155372 A1* | 5/2019 | Cuervo | G06T 1/60 |
| 2019/0313059 A1* | 10/2019 | Agarawala | H04L 65/403 |
| 2020/0097068 A1* | 3/2020 | Hamidi-Rad | G06F 3/011 |
| 2021/0390615 A1* | 12/2021 | Shin | G06F 3/04847 |

OTHER PUBLICATIONS

Gugenheimer, "ShareVR: Enabling Co-Located Experiences for Virtual Reality between HMD and Non-HMD Users", May 2017, URL: https://dl.acm.org/doi/pdf/10.1145/3025453.3025683 (Year: 2017).*

Lee et al., "CoVAR: A Collaborative Virtual and Augmented Reality System for Remote Collaboration", SIGGRAPH Asia 2017 Emerging Technologies, Nov. 2017, Article No. 3, pp. 1-2, URL: https://dl.acm.org/doi/pdf/10.1145/3132818.3132822 (Year: 2017).*

Empathic Computing Lab, "CoVAR: A Collaborative Virtual and Augmented Reality System for Remote Collaboration", May 9, 2018, YouTube, URL: https://www.youtube.com/watch?v=K_afCWZtExk (Year: 2018).*

* cited by examiner

*Primary Examiner* — David H Chu
(74) *Attorney, Agent, or Firm* — John L. Sotomayor (57) ABSTRACT

Systems and methods for item acquisition by selection of a virtual object placed in digital environment are disclosed. A processor(s) and memory may be configured to receive a coordinate for placement of a 2D or 3D virtual object in a 3D digital environment, including a digital twin of a real-world location, control the display to display the virtual object when a position corresponding to the received coordinate is within a field of view of the image capture device. The system receives an input via the user interface for selecting virtual objects which are then tracked in both the real-world and 3D digital environment simultaneously. The system enabling the accurate updating and display of all augmented reality and virtual reality content and digital twin data for a seamless blend of both to provide a shared cross-modal experience for all users.

20 Claims, 7 Drawing Sheets

SYSTEMS AND METHODS FOR SPATIAL CONVERSION AND SYNCHRONIZATION BETWEEN GEOLOCAL AUGMENTED REALITY AND VIRTUAL REALITY MODALITIES ASSOCIATED WITH REAL-WORLD PHYSICAL LOCATIONS

TECHNICAL FIELD

The present disclosure relates to systems and methods for selection of a virtual object placed in a digital environment and associated with real-world physical locations.

BACKGROUND

Augmented Reality and Virtual Reality are commonly defined and described as two distinct modalities at different ends of a horizontal spectrum (Milgram et al, 1994). Augmented Reality is generally understood as enhancing or augmenting the real-world through a digital annotation of data or an overlay of 3D objects (also referred to as mixed reality). Virtual Reality is understood to be a fully immersive experience in a 3D space, environment, or world.

The Metaverse, first used by Neal Stephenson in his 1992 novel "Snow Crash" is defined as a place where "humans, as avatars, interact with each other and software agents, in a three-dimensional space that uses the metaphor of the real world". The more common definition of the Metaverse is one or more expansive 3D environments (with or without the fully immersive aspects granted by a wearable display such as a head-mounted display), each interconnected and interoperable to some degree or another, with "metaverse" being a portmanteau of the root "meta" and the word "universe", suggesting all, beyond, between, and all-encompassing.

In contrast, the concept of "Cyberspace", coined by William Gibson in his 1982 short story "Burning Chrome" and later popularized in his debut novel Neuromancer in 1984, is more in line with the entirety of all "widespread, interconnected digital technology". However, he describes it thusly: "Cyberspace. . . . A graphic representation of data abstracted from banks of every computer in the human system. Unthinkable complexity. Lines of light ranged in the nonspace of the mind, clusters and constellations of data. Like city lights, receding . . . "

Both Metaverse and Cyberspace are interchangeable to a degree but have some fundamental differences. Cyberspace is based on the actual network, computer devices, and manipulation of data, represented in three-dimensions (a 3D or virtual reality environment), whereas Metaverse tends to be more about constructed 3D and virtual reality environments. As a result of the above, the industry generally conceives as Augmented Reality (AR) and Virtual Reality (VR) as two distinct and segregated technologies that are similar in many respects, but opposite ends of a spectrum instead of two sides of the same coin.

SUMMARY

Disclosed herein are systems and methods for item acquisition by selection of a virtual object placed in digital environment. It is the combination, or blending of both AR and VR together, with synchronization between both modalities based on or linked to real-world locations that is the basis of the invention.

Various techniques are used to create 3D immersive worlds and environments for simulations, games, social experiences, or overlaying 2D and 3D graphics, images, and objects over video for a variety of interactive experiences and other applications. There is a continuing need to provide consumers and companies with improved techniques and capabilities for immersive, interactive, collaborative, and informational functionality and experiences for augmented reality and virtual reality.

Disclosed herein are systems and methods for spatial conversion and synchronization of mapping, positioning, orientation, data, information, visualization, and content between geolocal augmented reality and virtual reality modalities linked to and/or associated with real-world physical locations.

The scope of the invention is related to the seamless blend of both Augmented Reality and Virtual Reality modalities which are linked together through conversion and synchronization of spatial and geospatial mapping and coordinate systems related to the real-world, enabling users in each modality to interact with each other and their environments in shared experiences, creating new functionalities and interactions for communication, collaboration, commerce, and content creation necessary for the Metaverse to realize its full potential and impact nearly every aspect of our daily lives.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smartphone, a smart watch, a cell phone, a pager, a personal digital assistant (PDA, e.g., with GPRS NIC), a mobile computer with a smart phone client, or the like. A computing device can also include any type of conventional computer, for example, a desktop computer, a laptop computer, a netbook computer, a notebook computer, a server, or the like. A typical mobile device is a wireless data access-enabled device, such as in a non-limiting example, an iPHONE® smart phone, a BLACKBERRY® smart phone, a NEXUS ONE™ smart phone, iPAD® device, an ANDROID compatible device, a SAMSUNG® device (e.g., SAMSUNG GALAXY® smart phone), or the like, that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet, or other communications network, on so-called mini- or micro-browsers, which are web browsers with small file sizes that can accommodate the reduced memory constraints of wireless networks, on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device. Computing devices may include wearable devices having displays and/or other user interfaces.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. In a non-limiting example of a user interface on a computing device, which may include any device with a data processor and data communication capability, includes a graphical user interface (GUI) that allows users to interact with programs in more ways than typing. A GUI typically can offer display objects, and visual indicators, as opposed to text-based interfaces, typed command labels or text navigation to represent information and actions available to a user. In a non-limiting example, a user interface can be a display window or display object, which is selectable by a user of a mobile device for interaction. The display object can be displayed on a display screen of a mobile device and can be selected by, and interacted with by, a user using the user interface. In a non-limiting example, the display of the mobile device can be a touch screen, which can display the display icon. The user can depress the area of the display screen at which the display icon is displayed for selecting the display icon. In an alternative example, the user can use any other suitable interface of a mobile device, such as a keypad, to select the display icon or display object, or the user can use a track ball or arrow keys for moving a cursor to highlight and select the display object.

User interfaces and GUIs may be affected by interaction with sensor devices, wearables, or computer vision interfaces where the user's motion is tracked by a device using computer vision techniques as the way to interact with the interface. In a non-limiting example, a person may wave his or her hand in front of an automatic door, and the sensor picks up the movement and triggers the door opening.

In similar fashion, some advanced AR and VR interfaces may track the fingers, hands, arms of the user for interaction, without needing other interfaces like keyboards, mice, or handheld/wearable devices or pointers.

As referred to herein, "Augmented Reality" may be any superimposed computer-generated image or 3D object on a user's view of the real world, thus providing a composite view, generally as an overlay on a video source. Spatial placement of the superimposed computer-generated graphics, images, video, 3D objects, or audio source is usually determined by computer-vision techniques to identify and track barcodes, glyphs, images, edge detection, point-clouds, planar surfaces, object recognition, or GPS coordinates. Usage of the term Augmented Reality includes definitions of Mixed Reality, which generally is focused on the super-imposition and spatial positioning of 3D objects and other media beyond data or other computer-generated imagery.

As referred to herein, "Virtual Reality" may be any 3D scene, space, environment, map, simulation, digital twin, or world that is viewable and/or navigable on one or more axis. This includes 3D games, virtual worlds, 3D maps, simulations, etc. In some embodiments, such virtual reality implementations may be visualized, accessed, interacted with, or represented as a 2D map, diagram, floorplan, or architectural drawing. A head-mounted display (HMD) may be used for increased immersion but is not necessary to experience any virtual reality implementation.

As referred to herein, a "communication channel" is any suitable type of connection between computing devices in which data may be exchanged. In a non-limiting example, a communication channel may be established between computing devices via a telephone call, an email communication, a text message communication, an instant message communication, and the like.

As referred to herein, a "3D object" is a three-dimensional object in digital form, rendered, displayed, experienced, and interacted with through a software application. Such software application may be, by way of non-limiting example, a 3D viewer, application, web browser, browser plugin or extension, game, virtual world, virtual reality, and/or augmented reality. 3D spaces, environments, and worlds are three-dimensional in nature and presentation, generally experienced through a software application (such as a desktop application), browser plugin or extension (something installed in a browser to enable 3D graphics), or web code that is interpreted by a browser (such as OpenGL, etc.).

In an embodiment, 3D objects may include 2D content (such as images, animations, streaming or pre-recorded video) in 3D form (such as an image mapped to the side of a plane or 3D cube) within a 3D environment, or may be represented or visualized in any environment (2D, 3D, browser, application, etc.) as a 2D object (such as an image, animation, etc.).

The term "Virtual Reality" covers all immersive 3D spaces, environments, and worlds, but is typically inclusive of some wearable display device (head-mounted display or HMD). Aside from the enhanced immersion that an HMD offers, there is little to no difference between a 3D world and a VR world. For the purposes of this document, 3D spaces, environments, worlds, and Virtual Reality (VR) are all interchangeable, and may be visualized or otherwise represented or referenced in 2D or 3D. We primarily use Virtual Reality to describe individually and collectively, but an HMD is not required.

In a representative operating embodiment, a computing device, such as a mobile device, is connectable (for example, via WAP) to a transmission functionality that varies depending on implementation. Thus, for example, where the operating environment is a wide area wireless network (such as a 3G, 4G, or 5G network), the transmission functionality comprises one or more components such as a mobile switching center (MSC), which may comprise an enhanced ISDN switch that is responsible for call handling of mobile subscribers, a visitor location register (VLR) which may be comprised of an intelligent database that stores on a temporary basis data required to handle calls set up or received by mobile devices registered with the VLR, a home location register (HLR), comprising an intelligent database responsible for management of each subscriber's records, one or more base stations that may provide radio coverage with a cell, a base station controller (BSC) comprising a switch that acts as a local concentrator of traffic and provides local switching to effect handover between base stations, and a packet control unit (PCU) which may be a device that separates data traffic coming from a mobile device.

Augmented Reality experiences are generally implemented as graphical overlay on a video source, giving the appearance of 2D graphics, 3D objects and models, and/or other digital media including audio, video, 360° video, and photos (collectively "content") spatially existing in the real world, which may be viewed, experienced, or interacted with, and may be static or dynamic in nature.

Spatial positioning of content typically relies on geospatial positioning systems (GPS) or one or more computer vision techniques, associating the content and its placement and positioning with a barcode, glyph, pattern, or image; association with a detected plane, surface, or edge, or a collection of the same as a "point cloud", or some other method of spatial or geospatial positioning using a variety of methods.

In an embodiment, one or more of these associations and experiences can be saved locally on the user device or on a remote server or cloud database to form a "cloud anchor", which can be retrieved at a later time and compared with live video and sensor data until a match is found, upon which point the related content may then be displayed at the correct spatial location and positioning associated with a real-world physical location as represented within the augmented reality video overlay.

Conversely, Virtual Reality experiences are based on a constructed 3D space, environment, or world (collectively "3D world", "world", "environment", or "space"), where content is placed according to global or local world coordinates specific to the 3D world itself. These 3D worlds are comprised of one or more 3D spaces that may or may not be interconnected or related to each other and can be any size or shape from a simple room to an entire galaxy or universe of fully created 3D worlds.

In an embodiment, 3D environments can also be constructed as "digital twins" which are three-dimensional digital copies, twins, or simulations of one or more "real world" spaces, locations, or environments with some level of spatial accuracy in architecture, form, and layout.

In this embodiment, the 3D digital twin environments may be exact duplicates or twins, based on a variety of 3D scanning and reconstruction techniques (using LiDAR or some other method) at 1:1 scale and accuracy and resolution down to centimeters. The 3D meshes, models, and or point clouds may be based on architectural and engineering plans, diagrams, blueprints, and documents, may be created from other computer vision, photogrammetry, photo, video, and 360 video sources, or may be general simulations that are close but not accurate in design and representation. The 3D digital twin environments are georeferenced and mapped to real-world geospatial coordinates and other reference systems.

The visual appearance of these digital twin spaces may vary, independent of the actual form and structure. In a non-limiting example, the texture and materials may be based on data from visual scanning, video, photography, etc. giving a photo-realistic or near photo-realistic appearance. Additional or alternative sets of textures and materials may be applied to the 3D mesh and 3D models, or rendering shader, changing the appearance and aesthetic of the visual appearance of any digital twin space.

In an embodiment, a remote user may be in a 3D/VR environment, such as a "digital twin", and another user may be on-site interacting with the remote user with AR, devices, sensors, and smart objects in the real-world. These users, one in the real-world location and the second in a 3D/VR "digital twin" environment of that same real-world location, would be capable of affecting their digital twin counterpart in AR, VR, virtual worlds, and/or 3D world and vice versa. In a non-limiting example, turning on a light in the real world would turn on the 3D light object in the virtual world, and vice versa. In another non-limiting example, unlocking a door in the real-world would unlock the 3D object in the 3D world or scene, or would change some object or visualization in AR, and vice versa.

In this embodiment, all real-world physical objects, such as furniture, appliances, plants, machinery, electronic devices, sensors, etc., may be represented as 3D models or other graphical representations within the 3D digital twin environment. These interactions recreate the real-world location with a resolution that permits the interaction of items in the 3D/VR digital twin environment as they are manipulated or interacted with in the real-world environment. The actions and interactions by users in either the 3D/VR environment, the digital twin of the real-world environment, or in the physical world are reflected into each environment as they occur in near real-time or in real-time.

In this embodiment, data relating to the properties and aspects of these real-world objects may be stored and/or associated with their respective 3D representations, as well as data, telemetry, and so forth generated by such objects (i.e. a temperature sensor on a piece of machinery or a kitchen appliance) which may be streamed, recorded, collected, and/or accessed by local or remote servers and databases or applications running the 3D world to provide data for visualization, animation, state changes, graphics, and 3D graphics related to, overlaid, linked to, or otherwise associated with the physical models in near real-time, real-time, or for future use. This data may also be stored, recorded, referenced, tracked, tokenized, or otherwise logged on one or more public or private blockchain ledgers to securely track and manage all interactions with data from each environment, both the 3D/VR environment and the digital twin real-world model.

In an embodiment, in augmented reality, real-world physical objects, appliances, sensors, etc. may be identified and spatially located in relation to other objects, using computer vision detected planes, surfaces, edges, point-clouds, GPS, or other spatial references and mapping.

In an embodiment, in both types of 3D VR environments, constructed or digital twin, a user is represented within the environment as an avatar, generally a 3D model, character, icon, marker, or other visual representation that is used to navigate and interact with the environment. In AR experiences, the user is generally not represented as a 3D Avatar within AR but may have one associated with their account and be represented or displayed in other applications such as a marker, icon, or 2D or 3D avatar on a 2D or 3D map, diagram, floorplan, architectural drawing, or through some other type of information and data display.

In this embodiment, the user representation, in whatever form, is tracked and managed within the AR overlay in direct relation to the actions and movements of the user in the real world. The spatial position of both the AR user in the real world and the remote user in a 3D VR world or other related environment, are tracked and may be represented or displayed in other applications or websites as a marker, icon, or a 2D or a 3D object or avatar. The system may comprise a 2D or 3D map, diagram, floorplan, or architectural drawing on a website or an application that displays the position and coordinates of one or more users, in relation to their position in the real world, regardless of which modality in which they exist, AR, VR, mixed AR and VR, or the real world.

In an embodiment, Non-User Entities (NUE), typically designated and defined as Non-Player Characters in game environments, may consist of 2D or 3D objects visualized or represented as characters, pets, creatures, non-player avatars, and or other entities created and managed by the system. Each NUE may have various characteristics, aspects, behaviors, properties, capabilities, animations, etc. that may be static, dynamic, or autonomous in nature. In this embodiment, each NUE may be controlled by code, scripts, or other methods such as artificial intelligence, machine learning, or co-opted and temporarily controlled by a user. Similar to other 2D and 3D objects, and virtual goods objects, each NUE may be tokenized or otherwise stored, recorded, or referenced on blockchain, may be unique, and may have various functions and capabilities. NUE objects may share similar characteristics, capabilities, behaviors, and properties of users and 2D or 3D objects.

In a non-limiting example, a NUE may be a 3D unicorn that is a unique 3D Non-fungible token (NFT), with original or inherited aspects or elements, that a user or an different NUE can interact with, collect, trade, transfer, acquire, exchange, redeem, or may be linked or otherwise associated with something in the real-world. The NUE may be designated as a "pet" and governed by a variety of code, scripts, or artificial intelligence, giving the NUE the resemblance of being an independent entity with various functionality and behaviors. These functions and behaviors may comprise being "owned" by a user, following a user around in any 2D or 3D, AR or VR, environment and space, and/or be capable of interacting with one or more users, other NUEs, and the environments itself. Each NUE may also change in function and form as it "evolves" or grows, or learns new behaviors, functions, and interactions.

In another non-limiting example, a NUE may have a fixed, static, dynamic, emergent, or customizable appearance as that of a celebrity, athlete, fictional or real character or being. Each NUE may present as a living or dead person or animal, and may have coding, scripts, behaviors, static, dynamic, or emergent interactions, and other capacity to interact with users. A NUE, or groups of NUE, may serve as a guide, trainer, educator, personality, performer, musician, actor, athlete, friend, associate, companion, or software agent for each user, or for groups of users in various environments.

In this non-limiting example, a NUE may be linked to or controlled by some other internal or external system, such as a smart speaker like, in non-limiting examples, Amazon's Alexa or Apple's Siri. Through this link or control function the NUE may give the appearance through the external device, program, artificial intelligence, script, or other as having a 2D or 3D "physical" form in any 2D, 3D, augmented, or virtual reality environment. As with users and other NUEs, they may be visualized, experienced, rendered, and interacted with in any modality (AR, VR, AR and VR combined, digital twin, or any other 3D environment) and are similarly spatially positioned and referenced.

In an embodiment, properties, aspects, and other data related to or generated by these real-world objects may be streamed, recorded, collected, and/or accessed by local or remote servers, databases, and applications running the augmented reality system, to provide, supply, or make accessible data for visualization, animation, state changes, graphics, and 3D graphics related to, overlaid, linked to, or otherwise associated with the physical objects with which the AR overlay is associated.

In an embodiment, the scope of the invention encompasses the spatial conversion and synchronization of mapping, positioning, orientation, data, information, visualization, and content between geolocal augmented reality and virtual reality modalities linked to and/or associated with real-world physical locations and objects. The synchronization of mapping, positioning, orientation, data, information, visualization, and content between user devices and applications, based on real-world location, with each user operating in a different modality (augmented reality or virtual reality) enables a variety of communication, collaboration, commerce, content creation, visualization, experiences, and interactions.

In this embodiment, this innovation provides for the blending of AR and VR for two or more users as a multi-user shared experience enabling a variety of interactions between real and virtual, local and remote, and AR and VR. Through the conversion of each respective user's location and position that is spatially referenced to one or more coordinate or mapping systems as well as maps and 3D digital twins, synchronizing the users together for shared experiences and interactions that are not otherwise possible.

In an embodiment, this is accomplished through a server acting as an intermediary between one or more users exploring a virtual reality environment that is georeferenced to a real-world location and one or more users physically at the real-world location using augmented reality with their own geospatial reference. The server continually tracks and updates each user's properties, actions, and spatial aspect (location, position, orientation), converting and synchronizing the spatial information between each user's modality.

This multi-user shared experience among multiple real-world and virtual environments may also be accomplished by direct user-to-user (peer-to-peer) data sharing and communication, with one or both user applications converting and synchronizing the data for accurate spatial updates and a shared user interactions and experience. In each case, this data may also be stored, recorded, referenced, tracked, tokenized, or otherwise logged on one or more public or private blockchain ledgers to provide for data and action security.

In an embodiment, interactions between users in one or more modalities (2D, 3D, AR, VR, etc.) are not limited to user-to-user interactions, but also may include user to environment interactions. Such user to environment interactions may affect, modify, change, or otherwise alter digital and virtual objects and content as well as physical objects and items in the real world. In a non-limiting example, as users interact with 2D or 3D objects in a 2D or 3D environment, virtual reality digital twin 2D or 3D constructed environment, or with 2D or 3D objects, data overlays, control interfaces, or physical objects in the real-world via augmented reality, the properties of the object, real or virtual, may change and be updated in all modalities. These changes are communicated to one or more servers or other user applications, updating the properties of the virtual object and/or the state of the real-world object.

In a non-limiting example, a device, sensor, machinery, or other real-world item, such as a smart home device (such as a lamp) may have a 3D object as its digital twin. The 3D object may be spatially located in the 3D VR digital twin environment matching its real-world location. When the item (using the lamp as an example) is turned on or off (or any other behavior, activity, action, property, telemetry, or real-time data streaming), data is sent to the server regarding its state change, which then changes or updates the properties of the 3D digital twin object.

In this non-limiting example, User1 may observe the change to the 3D object in the 3D VR environment and may interact with that object to manipulate it or change its state (turning the light on or off in the present non-limiting example). If so enabled, the server may then send a command, directive, or other data to the device and change its state in the real-world (such as turning the light off remotely through the 3D digital twin object in the 3D VR environment). User2, who may be at the location of the real-world lamp in this non-limiting example, would see the lamp turn on or off respectively.

In an embodiment, in a similar fashion, User1 may interact with the 3D digital twin object and retrieve data related to its real-world counterpart such as temperature, usage, power consumption, efficiency, installation date, user manual, instructional video, maintenance history, or other data or state information. This data and/or state information may or may not be recorded and stored on one or more public or private blockchain ledgers or other secure database, and may be streamed, downloaded, or otherwise accessed with or without access privileges and other requirements. Further, the data may be experienced as a data visualization or viewer within the 3D VR environment, or separately through some other application. At the same time, User2, physically at the location, may access the same data and files in the same fashion, but may also experience and interact with the data through an augmented reality interface or data visualization.

In this embodiment, the reverse is possible, where User2 interacts with the lamp, either physically, manually turning it on or off, or remotely using an application to communicate with the device and turn it on or off. Each interaction may result in the digital twin of the lamp in the 3D VR digital twin environment changing its state and appearance to the state or appearance of the real-world physical lamp. Other interactions may include machinery, devices, vehicles, sensors, systems in one or more contexts including industrial, supply chain, oil & gas, medical, retail, building management, tourism, hospitality, real-estate, food, esports, sports and entertainment, and so forth.

In a non-limiting example, User1 may use a desktop application or browser to explore a virtual reality digital twin of Miami's South Beach and may position their user avatar on Collins Avenue outside of the Triton Supermarket. The 3D VR digital twin environment is mapped to real-world geospatial coordinates, which provides an accurate location of User1's avatar on Collins Avenue outside of the Triton Supermarket in the digital twin environment.

In this non-limiting, example, User2 may be physically located in Miami, also in Miami South Beach outside of the Signature Rent-a-Car across the street from the Triton Supermarket. Each user has accessed an augmented reality application running on a mobile device, such as a smartphone, associated with each user. The augmented reality application has determined each user's GPS address from the on-board GPS system within each mobile device. This data, as well as their position and orientation derived from other sources on the smartphone (accelerometer, compass, computer vision techniques, etc.) may be sent to the server. The server may synchronize and convert the spatial data to match the 3D VR world, and the server then communicates User2's position and orientation to User1's mobile device application, rendering User2's avatar within the 3D VR digital twin environment for User1 to see and interact with.

Simultaneously, the server communicates with User2's augmented reality application and updates the content displayed to show a 3D avatar of User1, spatially located across the street, matching their position and orientation in the 3D VR environment.

As the User1 avatar moves around exploring the 3D VR environment, the mobile device application updates the server, which then updates User2's AR application, moving the User1 avatar in the AR application accordingly. At the same time, as User2 moves around in the real-world, the process repeats, updating the server, and User1's mobile device application.

In an embodiment, User1 is remotely exploring a 3D digital twin of a real-world location, in this case Miami, with a 3D avatar representing them in the digital twin as a medium for interaction and point of view. In addition to being a visual copy and simulation of Miami, the 3D meshes, models, textures, landscape, etc. are all georeferenced and geospatially mapped to one or more real-world geographic coordinate systems (such as Global Positioning System (GPS)). As User1 navigates around the 3D digital twin of Miami, the position and orientation of User1 within the 3D digital twin is simultaneously tracked and synchronized to the real-world coordinates.

In this embodiment, simultaneously, User2 is physically located in Miami, with a mobile device, generally a smartphone, running an augmented reality application. This application determines the location and position of User2 (via GPS or other described method), which is used to determine what content is retrieved from a local or remote server (or other data source) and then rendered on a video source or other visual medium (such as transparent wearable displays). This rendering to the video source or other visual medium gives the appearance of the digital content existing in the real world which they may access or otherwise interact with.

In this embodiment, because both users have location, positioning, and orientation data within their respective modalities, both of which may be converted to a common georeferenced geospatial coordinate system associated with real-world geographic coordinate systems, the systems and methods described herein enable new interactions such as User1's VR avatar appearing in the real-world at appropriate spatial positioning and orientation for User2 to view and interact with through their mobile device and augmented reality application. Conversely, User2's spatial positioning and orientation, derived from GPS and other methods, is then associated with an avatar (linked to their user account) that will be displayed accurately within the 3D VR digital twin environment that User1 is exploring and navigating.

In a non-limiting example, User1 may initiate a new interaction by selecting a 3D object from their inventory and drops or places it on a street corner in the 3D VR digital twin constructed 3D environment. The mobile application on a device associated with User1 may update the server and/or nearby users, and the dropped object now appears in the 3D VR digital twin constructed 3D environment for other users to see and with which other users may now interact. Simultaneously, the object may appear in a real-world view at the same location for local on-site users, such as User2, in the real-world to see and interact with via an augmented reality application overlay that is linked with the digital twin 2D or 3D constructed environment representing the real-world location.

In this non-limiting example, User2 may select and pick up or collect the 3D object that User1 dropped and add it to their inventory or otherwise interact with the 3D object. User2 may elect to drop the virtual object back in the real-world or may move to a different location and place it there. The augmented reality application on the device associated with User2 may then communicate with the server and/or other nearby users. This communication provides the data updates the system for both augmented reality and virtual reality applications to show the object at the new location in both modalities.

In another non-limiting example, User1, exploring the 3D VR digital twin environment may approach User2's avatar, click or otherwise select the avatar and use an interface control or option to open a VoIP (Voice over Internet Protocol) channel or a streaming audio and video feed. User2 may see a prompt, pop-up, or other notification of the incoming communication and may accept it, immediately connecting the two users in a voice or video call, within the context of VR for User1 and in AR for User2. To display a video, a 3D screen or other graphic user interface (GUI) element will appear near, over, or above each user's avatar within the respective environments.

Alternatively, in this non-limiting example, instead of an audio or video communication, User1 may initiate a direct trade with User2, represented as a prompt, pop-up, or other notification or GUI element, where data, files, media, 2D or 3D objects, and/or virtual goods may be transferred between both users.

In another non-limiting example, User3 may use an application or browser to view a 2D or 3D map, diagram, floorplan, or architectural drawing of the location, which is continually updated with the location, position, and orientation of User1, User2, and any geospatially referenced content, which they may access and retrieve information from (such as activity, state, history, properties, etc.), or they may geolocate content to the map (such as 3D objects, or other data, media, and so forth) which is communicated to the server, and subsequently to User1 and User2 devices and applications, updating their respective maps and environments to display the new content at the same spatial designation as the 2D or 3D map, diagram, floorplan, or architectural drawing, or other user input interface that User3 activated.

In this non-limiting example, User3 could select a 2D or 3D object, such as a 3D treasure chest from a library of 3D objects that they have ownership of and is related to their account (or some other method of uploading or accessing 3D objects and other content types). User3 may then drag and drop the selected 3D object on the map, effectively "placing" it for User1 and User2 to see, access, and interact with via their respective devices and applications. Alternatively, User3 could simply upload a file, list, or database that contains a 3D object and other content listed with various properties, behaviors, graphics, textures, animations, etc. The 3D object or other content may or may not be tokenized and on blockchain, however the 3D object or other content could populate the server databases and subsequently the devices and applications for other users. In this example, access to the content may be provided to User1 and User2, where the content may be seen, displayed, accessed, and interacted with via their respective modalities in AR or 3D VR.

In another non-limiting example, User1 may log into a 2D or 3D environment, which may be a 2D or 3D representation, digital twin, or a constructed environment, that is associated with User2's home. As in previous examples, User1 is navigating and exploring the 2D or 3D environment, in this case with a desktop personal computer and a desktop or browser-based application with a 2D or 3D avatar representing them and acting as their agent within the system.

In this non-limiting example, User2 may have a mobile device, such as, in a non-limiting example, a smartphone, with an augmented reality application, or they may have a head-mounted display (HMD) which may have a wireless or tethered connection to a nearby electronic device such as a desktop computer, smartphone, laptop, or other device, any of which may be running an augmented reality or virtual reality application. The room may have been previously mapped for the purposes of a 2D or 3D digital twin representation, or it may be a constructed 3D VR space (such as the bridge of a starship) with some dimensions related to the room itself or a "safe zone" with boundaries determined by the hardware, software, or other spatial sensing, tracking, capture, motion capture, sensor, sensor fusion, or computer vision methodology.

In this non-limiting example, the spatial coordinates of User1 within the 3D environment may be converted and synchronized appropriately to the digital twin or constructed 3D environment of the physical room, placing their avatar in the correct location and position. Simultaneously, User2's spatial positioning and orientation is similarly converted and synchronized in the real world to match that of the 3D digital twin representation or constructed 3D environment to accurately place the avatar associated with their account in the 3D digital twin or constructed 3D environment with which User1 is interacting.

In the context of this non-limiting example, the spatial positioning and orientation of each user is relative to the real-world room and simultaneously a 3D digital twin or constructed 3D environment. Conversion of the separate coordinate systems and synchronization between each environment, both real-world and virtual, for the same cross-modality shared experience as in Example 1 and Example 2 does not require geographic geospatial coordinate or mapping systems.

However, in this non-limiting example, there is still a relation to the real world as the basis of the 3D digital twin or constructed 3D environment is based on User2's real-world physical home or specific room (or rooms) that have been spatially mapped.

Figure 1:
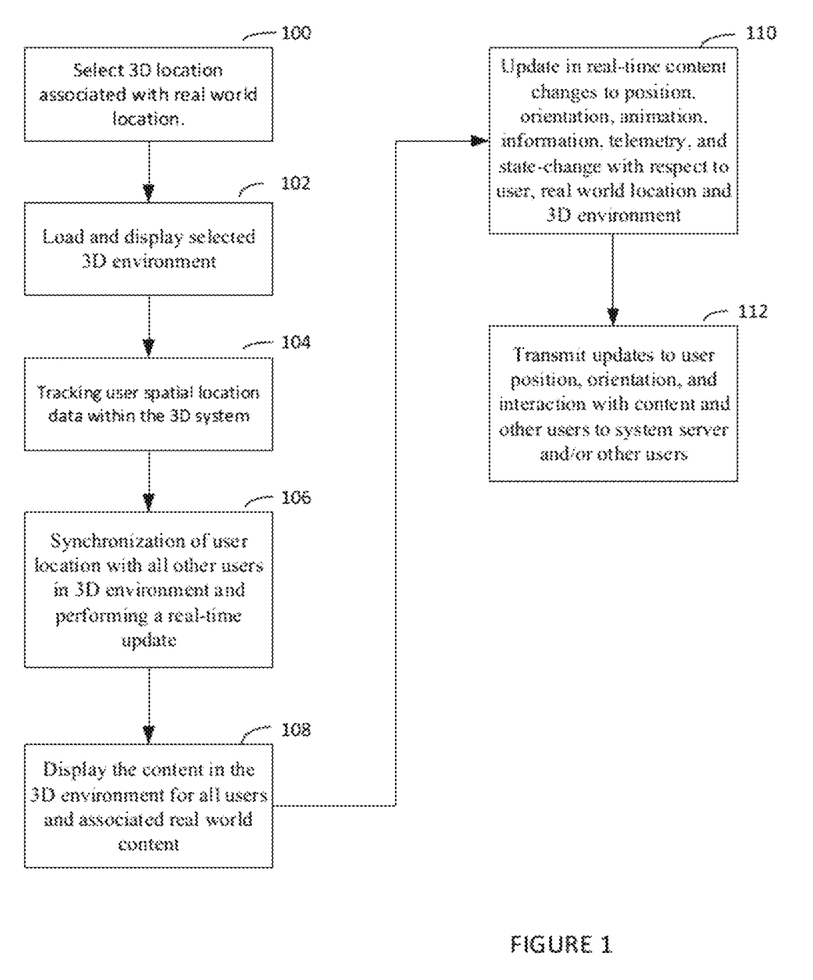
FIG. 1 is a flow diagram of the connection with a real-world object in an AR or VR environment consistent with embodiments of the present disclosure.

Turning now to FIG. 1, this figure presents a flow chart for the connection with a real-world object in an AR or VR environment consistent with embodiments of the present disclosure. In this non-limiting example, User1 launches an application on their device (smartphone, laptop, tablet, HMD, desktop, etc.) which displays a 3D environment which is a constructed 3D environment or 3D VR digital twin of a real-world environment, associated with or linked to a real-world location.

In an embodiment, at 100 a user, such as User1, may select a Location. The location may be a 3D environment based on or associated with a real-world location which will then load and display the 3D environment. At 102, the local application may load and display a 3D environment where the application on the user's device may request or receive data from a system server determining what the selected environment looks like and what content is associated with the environment as a whole. In this construction, the display may include a 3D world, buildings, meshes, objects, etc. as well as information related to other users that are logged in to the same environment or location. This data may be present on the device or retrieved from an external source such as a server, database, or application, and may or may not be logged, tracked, stored, or recorded on public or private blockchain ledger, database, or other blockchain implementation or protocol.

At 104, one or more servers may track each user's spatial location, position, and orientation (collectively "location data") within the 3D environment and its coordinate system. At 106, the one or more servers may convert the location data and synchronize all data with other users and their respective coordinate systems and location data on an ongoing basis, frequently updating the server and other user's applications. At 108, the system may also display content in VR and AR. The application displays the 3D environment and all associated content, including avatars of other users logged into the system, each spatially located.

At 110, as User1 navigates the 3D environment, the application active on the mobile device associated with User1 continually requests and/or receives updates from server or other user device(s) and/or application(s) on content changes including position, orientation, animation, information, telemetry, state-change, etc. and then displays such content in its updated state. In addition, at 112, the application may send updates on User1's position, orientation, and interaction with content and other users to the server and/or other users.

Figure 2:
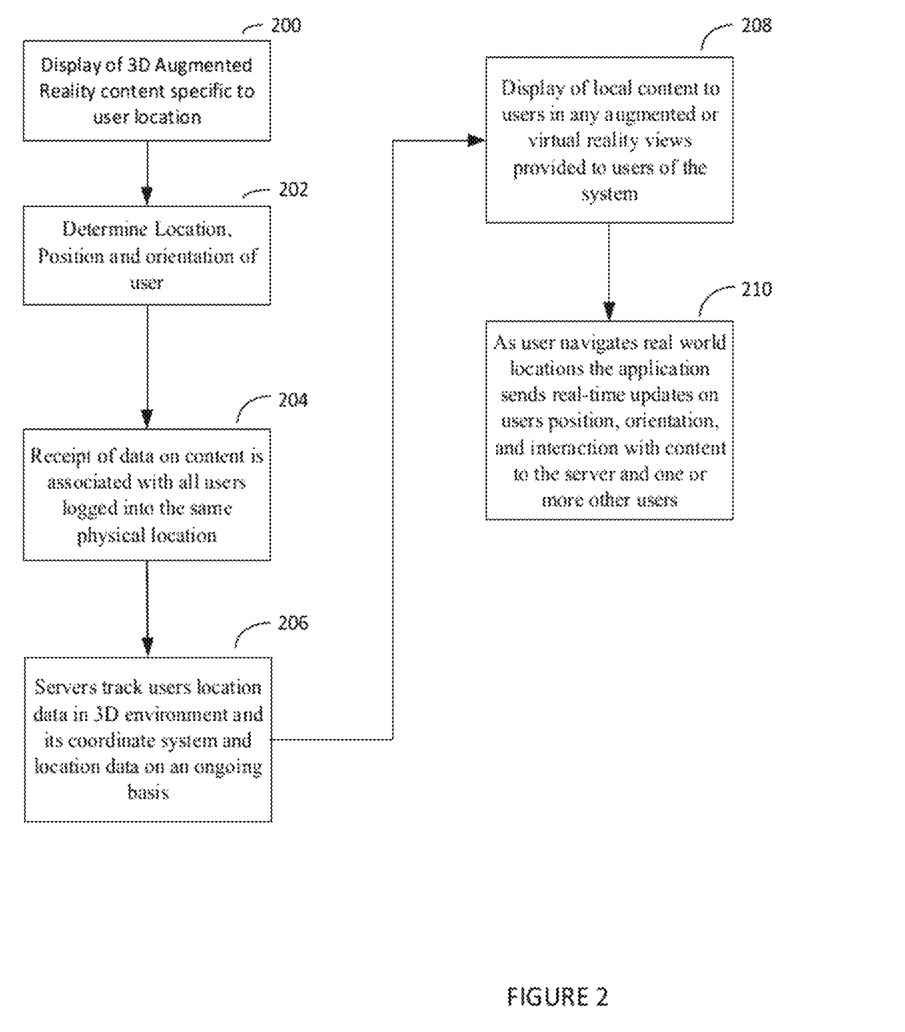
FIG. 2 is a flow diagram of tracking of connected real world and virtual world items, users and locations consistent with embodiments of the present disclosure.

Turning now to FIG. 2, this figure presents a flow diagram of tracking of connected real world and virtual world items, users and locations consistent with embodiments of the present disclosure. In this process flow, at 200 User2 may launch an application on a mobile device associated with User2, which displays 3D augmented reality content specific to the User2 location. The User may open the augmented reality application on a mobile device, such as a smartphone or a tablet. At 202, the location of the user and device is determined using one or more methods including but not limited to GPS, WI-FI® triangulation, BLUETOOTH™, cellular, scanning a hardware device such as RFID or a beacon, querying a local augmented reality server or dedicated device, or selecting from a list of nearby locations on the app. Alternatively, computer vision techniques for image, object recognition, point-cloud, or cloud-anchor as well as data from device sensors (such as an accelerometer), can be used to further determine the location, as well as position and orientation of the user.

At 204, upon determining the location, position, and orientation of the user, the application requests or receives data from the server determining what content is associated with the location, such as 3D objects, meshes, as well as avatars of other users that are logged into the same environment or location. This data may be present on the device or retrieved from an external source such as a server, database, plugin, extension, or application, and may or may not be logged, tracked, stored, or recorded on public or private blockchain ledger, database, wallet, or other blockchain implementation or protocol.

At 206, one or more servers tracks the user's spatial location, position, and orientation (collectively "location data") within the 3D environment and its coordinate system, while converting the location data and synchronizing it with other users and their respective coordinate systems and location data on an ongoing basis, frequently updating the server and other user's applications.

At 208, the augmented reality application then displays local content (such as data visualizations, 3D objects, and representations or avatars of other users) in the application (including map and video augmented reality views).

At 210, as User2 navigates the real world, their application continually requests and/or receives updates from server or other user device(s) and/or application(s) on content changes including position, orientation, animation, information, telemetry, state-change, etc. and then displays such content in its updated state. In addition, the application sends updates on User2's position, orientation, and interaction with content and other users to the server and/or other nearby users.

During the process above, when the server receives location data from User1 in the 3D VR digital twin environment and User2 in the real world, it converts the geolocal spatial data and coordinate values from each and localizes to the system's mapping and digital twin environment, and synchronizes between each, enabling the accurate updating and display of all augmented reality and virtual reality content and data for a seamless blend of both and a shared cross-modal experience.

During the process above, in step 3, Conversion and Synchronization, for both User1 and User2, when the server receives location data from User1 in the 3D environment and User2 in the real world, it converts the respective spatial data and coordinate values from each and synchronizes to each User's system's mapping and 3D environment or spatial coordinates, enabling the accurate display and updating of all augmented reality and virtual reality content and data for each user for a seamless blend of augmented and virtual reality as a shared multi-user cross-modal experience.

Figure 3:
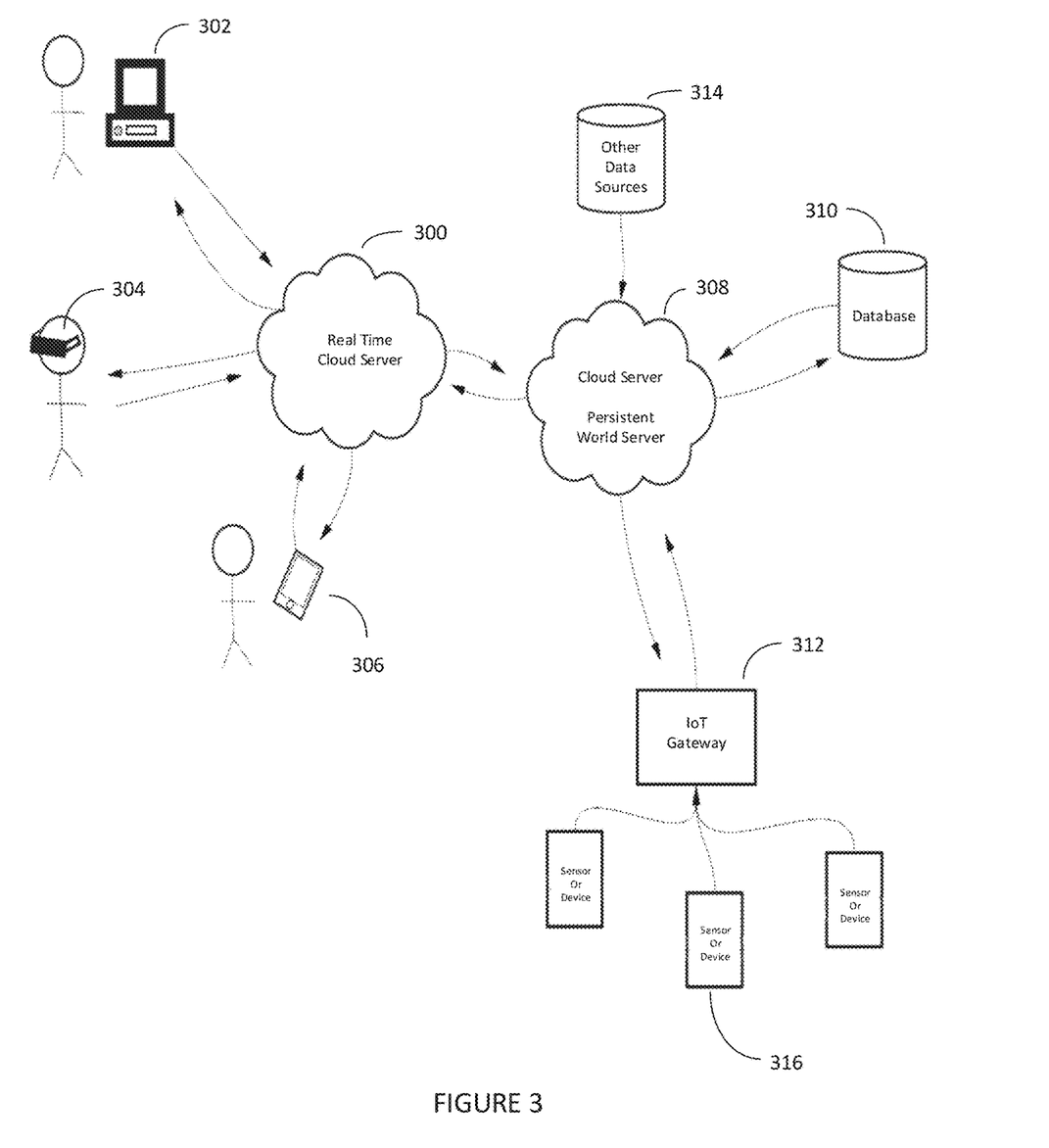
FIG. 3 is a diagram of an example server configuration with IoT integration consistent with embodiments of the present disclosure.

Turning now to FIG. 3, this figure presents an example server configuration with IoT integration consistent with embodiments of the present disclosure. In an embodiment, a user may connect to a real-time cloud server 300 through a computer system such as a laptop or other computer 302, through a VR headset 304, through a mobile device 306, such as, in a non-limiting example, a mobile phone, smart phone, iPad, tablet, or other Near Field Communication (NFC) enabled mobile device. The real-time cloud server 300 is in bi-directional communication with a Cloud Server 308 that operates as a persistent world server. The Cloud Server 308 may receive data from an associated data base system 310, from an IoT Gateway server 312, or from other data sources 314 as needed to perform integration actions. The IoT Gateway server 312 may be connected to one or more IoT enabled devices or sensors 316 for data and operational management communications.

Figure 4:
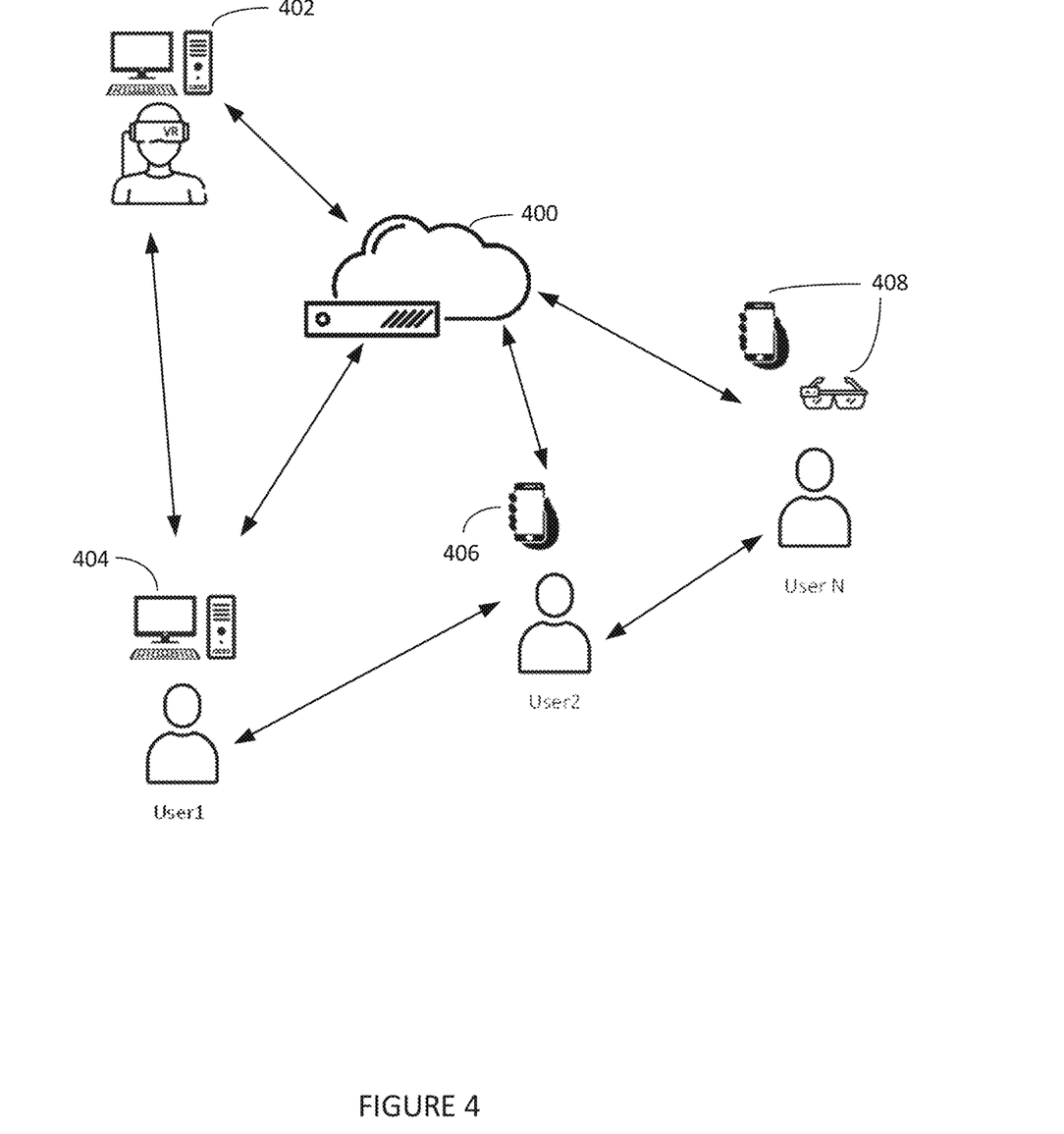
FIG. 4 is a diagram of an example AR/VR blend configuration consistent with embodiments of the present disclosure.

Turning now to FIG. 4, this figure presents an example AR/VR blend configuration consistent with embodiments of the present disclosure. In an embodiment, the system may be managed and controlled through a particular server configuration 400. The server configuration 400 may be active to perform multi-modal map coordinate conversion and synchronization for all users active and utilizing the system. In this configuration, one or more server and database configurations act as an application and content host and intermediary facilitating communication, data transfer, content management, tracking and mapping, coordinate conversion and synchronization. In this embodiment, users may also communicate and interact directly in a peer-to-peer or client-server model with or without a server intermediary.

In a non-limiting example, a user may be remote from the server configuration 400 and be using a 3D virtual reality headset or other 3D communication and display device 402 to connect to the system through a 3D VR application active on a computing device in communication with the 3D communication and display device 402. All remote users may use any of the various hardware and software configurations 404 for 3D VR, including but not limited to a desktop PC, VR headmount display, or any other 3D communication and display device 402.

In a non-limiting example, a user maybe in a location remote from the server configuration 400 and be in communication with the system utilizing augmented reality (AR) as the user's modality and interface to 3D content 406. Users in communication with the server configuration 400 through an AR connection may use any of various hardware and software configurations for AR, including but not limited to smartphones, tablets, wearable displays, and other devices that utilize AR to communicate 408.

Figure 5:
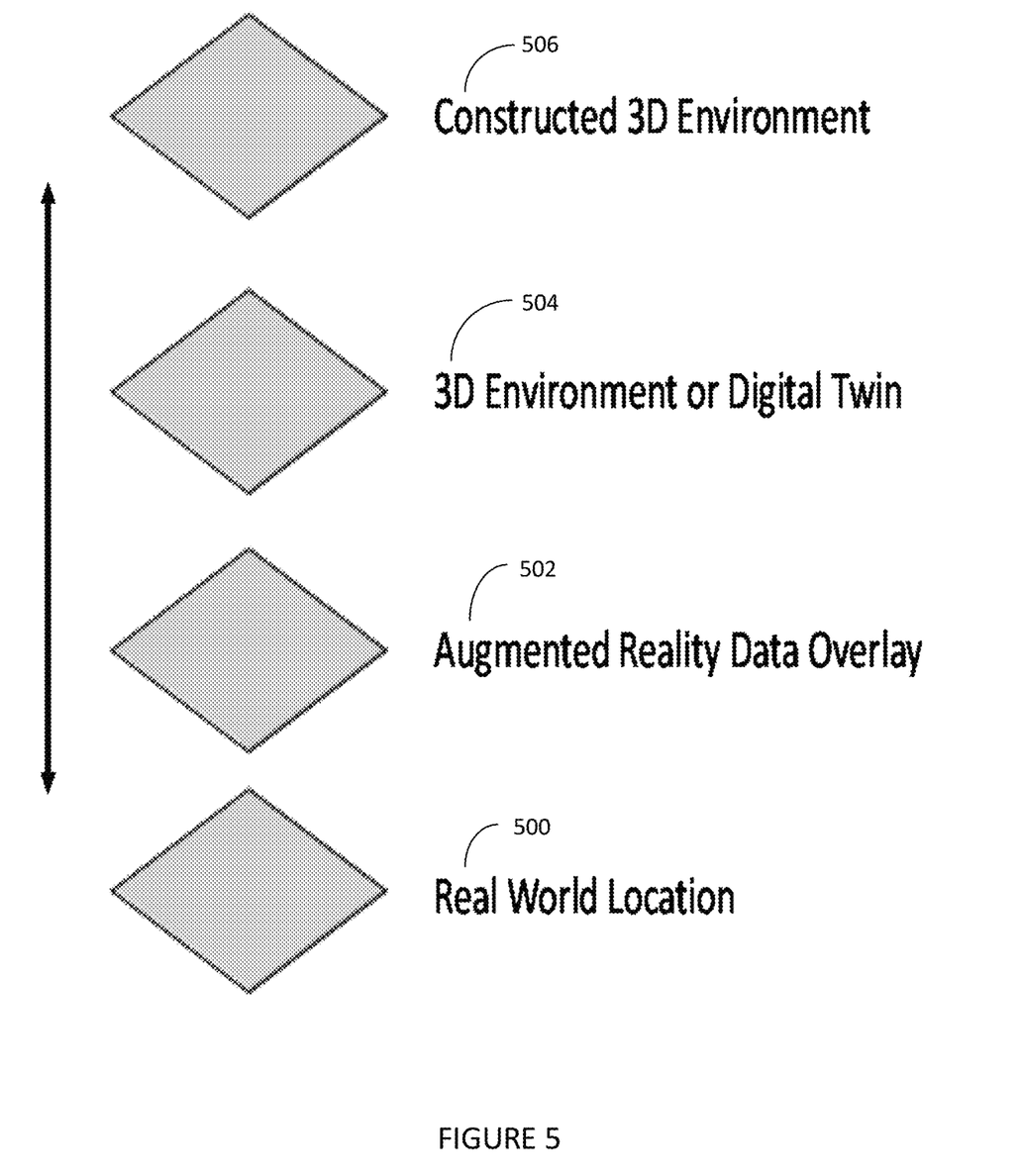
FIG. 5 is a diagram of an example of an AR/VR blend data layer configuration consistent with embodiments of the present disclosure.

Turning now to FIG. 5, this figure presents an example of an AR/VR blend data layer configuration consistent with embodiments of the present disclosure. In an embodiment, the AR and VR environments are continually interconnected, linked to, based upon, and/or associated with one or more real world locations. At 500 a real-world location upon which to base system interaction is selected. The real-world location may then be overlain with an AR overlay to provide an augmentation of 2D and 3D objects and images in associated with the selected real-world location at 502. At 504 the system may create a 3D environment overlay on the selected real-world location, and/or may create a digital twin of the selected real-world location. At 506 the constructed 3D environment may provide a layer for interaction by one or more users. In this embodiment the system creates and tracks coordinate systems for the real-world location, augmented reality data overlay, 3d digital twin, and constructed 3D environment through conversion and synchronization of the coordinate systems between each modality.

Figure 6:
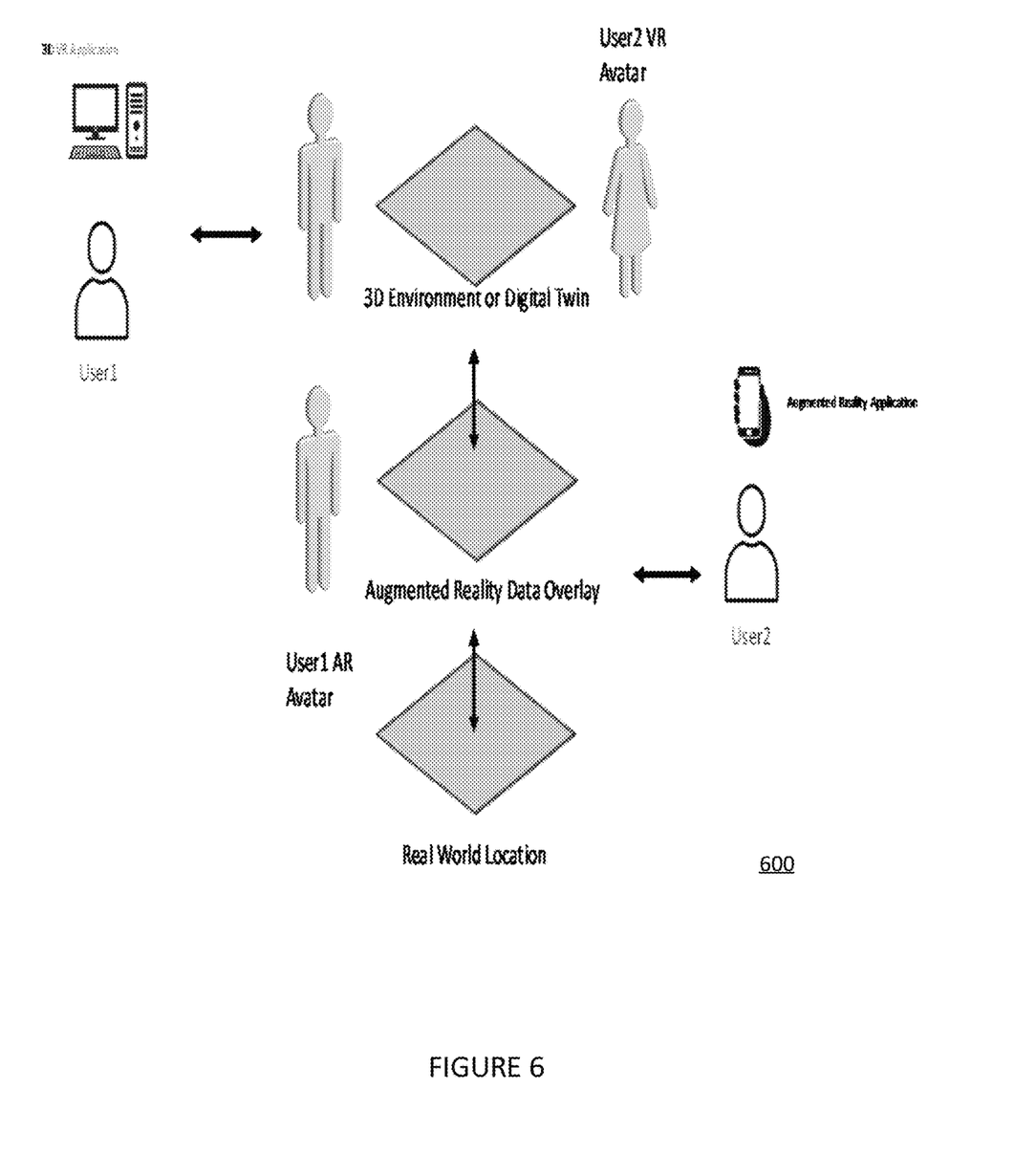
FIG. 6 is a diagram of an active server configuration with IoT integration consistent with embodiments of the present disclosure.

Turning now to FIG. 6, this figure presents an active server configuration with IoT integration consistent with embodiments of the present disclosure. In this embodiment, the system provides for a server configuration having an integration capability with one or more IoT devices. The content in the AR data overlay and the 3D environment or digital twin is all linked to, associated with, or based on the real-world location and its geographical, geospatial, or other location coordinate system at 600.

In this non-limiting example, a first user, User 1, sees their avatar in the 3D environment and sees another user, in this instance User 2, avatar in the 3D environment. User 2's avatar location is synchronized to User 2's real-world location as mapped and converted to the 3D environment. In this non-limiting example, User 2 sees User 1's avatar in Augmented Reality. The location of the avatar associated with User 1 in the real world, through the AR mapping, may be synchronized to each user's converted mapping coordinates in the 3D environment. The system may overlay a 3D environment or digital twin on both the AR overlay and the real-world location to permit the synchronization of converted spatial and geospatial coordinate systems for the real-world location, AR overlay, and 3D environment or digital twin.

Figure 7:
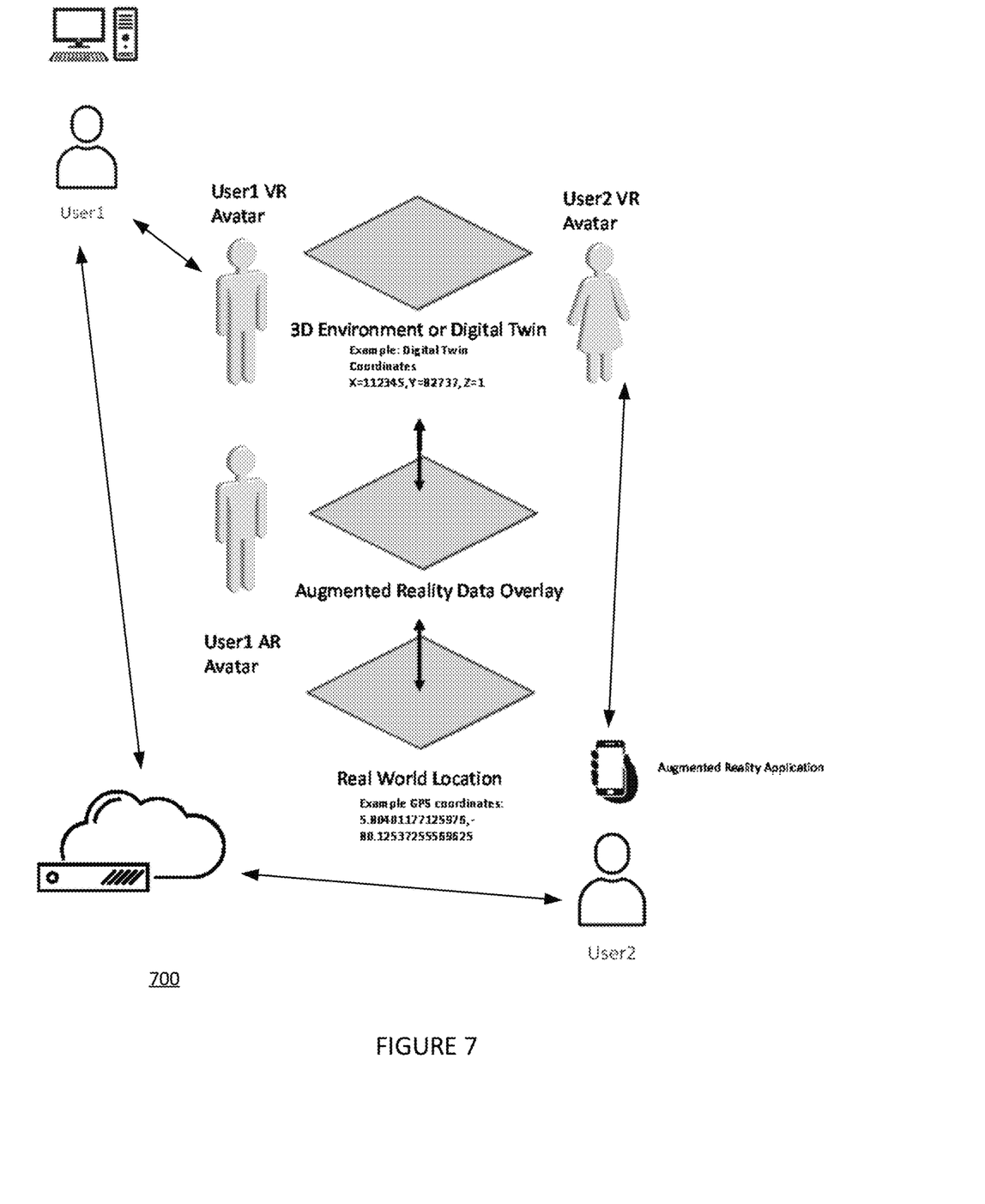
FIG. 7 is a diagram of an example of a 3D digital twin and AR coordinate synchronization configuration consistent with embodiments of the present disclosure.

Turning now to FIG. 7, this figure presents an example of a 3D digital twin and AR coordinate synchronization configuration consistent with embodiments of the present disclosure. In an embodiment, a non-limiting example of a Digital Twin and AR Coordinate Synchronization is presented 700. In this non-limiting example, a real-world location is present by known GPS coordinates for that real-world location. An AR data overlay and a 3D environment or digital twin of the real-world location are created for the given GPS coordinates. In this non-limiting example, Avatars for multiple users are created and populate the combined real-world, AR overlay, and 3D environment or digital twin for a given real-world location. In this example, the Cloud Server is updated from each user application which converts and synchronizes spatial location and other data for a cross-modal shared experience. In this cross-modal shared experience, a user, such as User 2 may be located in the real world at "Triton Supermarket" in Miami, Fla., at GPS coordinates 5.80401177125976, 80.12537255569625. The Cloud Server receives the update on position from the augmented reality application associated with User 2. The system then converts the received coordinates to the equivalent coordinates in the created 3D environment or digital twin. In this non-limiting example, the received GPS coordinates may correspond to the "Triton Supermarket" in Miami in the 3D environment or digital twin at coordinates X=112345, Y=82737, Z=1. Thus, locating User 2 in the real world and digital twin of the real-world environment at the same location. The system continues to receive coordinate and other data and continues to track and manage the location of all users in each modality of the environment.

I claim:

1. A system comprising:
    a data processor embodied in a cloud-connected server;
    said data processor creating an augmented reality (AR) environment overlay having a first set of geospatial reference coordinates;
    said data processor creating a separate 3D interactive virtual environment (IVE) that is a digital twin of a real-world environment and having a second set of geospatial reference coordinates;
    said data processor mapping a first user location, position, and orientation within the geospatial reference coordinates of said AR environment and mapping a second user location, position, and orientation within said 3D IVE;
    said data processor converting said first set of geospatial reference coordinates to the same relative geospatial reference coordinates within the second set of geospatial reference coordinates of said digital twin;

said data processor converting and synchronizing each of said first and second user location, position, and orientation within said AR environment and said digital twin as an AR environment overlay;

said data processor transmitting, loading and displaying said AR environment overlay on each mobile device associated with a user;

said data processor synchronizing said AR environment overlay with said 3D IVE to reference each of said user's location, position, and orientation within both said AR environment and said 3D IVE environment;

said data processor performing a real-time update of all data and all user locations in said first set of geospatial reference coordinates and said second set of geospatial reference coordinates and reflecting said real-time update into both said AR environment overlay and said 3D IVE environment;

said data processor transmitting real time updates to each of said AR environment overlay and 3D IVE to update and synchronize all user and content elements and locations within each environment;

said update and synchronization of content enabling the accurate updating and display of all augmented reality and virtual reality content and data for a seamless shared cross-modal experience for any user in the IVE and any user in the AR overlay environment.

2. The system of claim 1, where the AR environment overlay is characterized as augmented reality, virtual reality, 3D world, 3D environment, 3D browser, 3D viewer, and/or 3D application.

3. The system of claim 1, where the real-time update comprises the update of all changes to position, orientation, animation information, telemetry, and state-change for said AR environment overlay and said IVE.

4. The system of claim 1, further comprising transmitting updates to user position, orientation, and interaction for all users in said AR environment overlay and said IVE.

5. The system of claim 1, where said user positions are tracked according to user spatial location within each of said environments.

6. The system of claim 1, where said display includes a 3D world, buildings, meshes, objects, etc. as well as information related to other users that are logged in to the same environment or location.

7. The system of claim 1, further comprising data present on the device or retrieved from an external source such as a server, database, or application.

8. The system of claim 7, further comprising data that is logged, tracked, stored, or recorded on public or private blockchain ledger, database, or other blockchain implementation or protocol.

9. The system of claim 1, where a content element comprises a 3D Non-fungible Token (NFT).

10. The system of claim 9, where a user interacts with an NFT to collect, trade, transfer, acquire, exchange, redeem, or link with said content element in the real world.

11. A method comprising:

creating an augmented reality (AR) environment reality having a first set of geospatial reference coordinates;

creating a separate 3D Interactive Virtual Environment (IVE) that is a digital twin of a real-world environment and having a second set of geospatial reference coordinates;

mapping a first user location, position, and orientation within the geospatial reference coordinates of said AR environment and mapping a second user location, position, and orientation within said 3D IVE;

converting within a data processor said first set of geospatial reference coordinates to the same relative geospatial reference coordinates within the second set of geospatial reference coordinates of said digital twin;

converting and synchronizing within said data processor each of said first and second user location, position, and orientation within said AR environment and said digital twin as an AR environment overlay;

loading and displaying said AR environment overlay on each mobile device associated with a user;

synchronizing said AR environment overlay with said 3D IVE to reference each of said user's location, position, and orientation within both said AR environment and said 3D IVE environment;

performing a real-time update of all data and all user locations and reflecting said first set of geospatial reference coordinates and said second set of geospatial reference coordinates to perform a real-time update into both said AR environment overlay and said 3D IVE;

transmitting real time updates to each of said AR environment overlay and 3D IVE to update and synchronize all user and content elements and locations within each environment;

said update and synchronization of content enabling the accurate updating and display of all augmented reality and virtual reality content and data for a seamless a shared cross-modal experience for any user in the IVE and any user in the AR overlay environment.

12. The method of claim 11, where the AR environment overlay is characterized as augmented reality, virtual reality, 3D world, 3D environment, 3D browser, 3D viewer, and/or 3D application.

13. The method of claim 11, where the real-time update comprises the update of all changes to position, orientation, animation information, telemetry, and state-change for said AR environment overlay and said IVE.

14. The method of claim 11, further comprising transmitting updates to user position, orientation, and interaction for all users in said AR environment and said IVE.

15. The method of claim 11, where said user positions are tracked according to user spatial location within each of said environments.

16. The method of claim 11, where said display includes a 3D world, buildings, meshes, objects, etc. as well as information related to other users that are logged in to the same environment or location.

17. The method of claim 11, further comprising data present on the device or retrieved from an external source such as a server, database, or application.

18. The method of claim 17, further comprising data that is logged, tracked, stored, or recorded on public or private blockchain ledger, database, or other blockchain implementation or protocol.

19. The method of claim 11, where a content element comprises a 3D Non-fungible Token (NFT).

20. The method of claim 19, where a user interacts with an NFT to collect, trade, transfer, acquire, exchange, redeem, or link with said content element in the real world.

* * * * *